United States Patent [19]
Everett et al.

[11] Patent Number: 5,543,623
[45] Date of Patent: Aug. 6, 1996

[54] METHOD FOR DETECTING AND MITIGATING UNDERGROUND ORGANIC CONTAMINATION

[75] Inventors: Lorne G. Everett, Santa Barbara; David Blakely, Rightwood, both of Calif.

[73] Assignee: TTI Environmental Inc., Irvine, Calif.

[21] Appl. No.: 739,160

[22] Filed: Jul. 31, 1991

Related U.S. Application Data

[63] Continuation-in-part of Ser. No. 321,578, Mar. 9, 1989, abandoned, which is a continuation-in-part of Ser. No. 212,496, Jun. 28, 1988, abandoned, which is a continuation-in-part of Ser. No. 820,458, Feb. 17, 1986, Pat. No. 4,754,136.

[51] Int. Cl.$^6$ .................................................. G01N 23/204
[52] U.S. Cl. ...................................... 250/390.04; 250/391
[58] Field of Search ........................... 250/390.04, 391, 250/392, 301, 253

[56] References Cited

U.S. PATENT DOCUMENTS

| | | | |
|---|---|---|---|
| 2,567,057 | 9/1951 | Crumrine | 250/390.04 |
| 3,060,315 | 10/1962 | Scherbatskoy | 250/390.04 |
| 4,618,855 | 10/1986 | Harding et al. | 340/605 |
| 4,754,136 | 6/1988 | Blakely | 250/301 |
| 5,155,356 | 10/1992 | Peters et al. | 250/392 |
| 5,264,349 | 11/1993 | De Baere | 435/29 |

*Primary Examiner*—Carolyn E. Fields
*Attorney, Agent, or Firm*—Fulbright & Jaworski L.L.P.

[57] ABSTRACT

This technique for detecting underground contamination by organic fluids employs a plurality of spaced-apart boreholes adjacent a region to be tested for contamination. A neutron backscatter gauge is introduced into each of the boreholes for measuring the concentration of hydrogen in the soil surrounding the borehole. Such measurements are made at a plurality of spaced elevations along such a borehole and the distribution of hydrogen concentration as a function of elevation is compared with the expected distribution of hydrogen from underground sources of hydrogen, for distinguishing organic fluid contamination from other sources of hydrogen. For example, one can distinguish buried concrete or underground water from organic contamination. Measurements can also be made using chemical analysis methods. In another embodiment, the invention is used to profile and affect biodegradation. A plurality of spaced apart boreholes are provided in the buried material (for example, dump site). Hydrogen concentrations are measured over a period of time. Substantially unchanging hydrogen concentration in a region would indicate lack of aerobic degradation. Biodegradation can also be evaluated by monitoring the concentration of other biodegradation products. Changes in the biodegradation rate may be affected by injecting material into the region.

6 Claims, 5 Drawing Sheets

METHOD FOR DETECTING AND MITIGATING UNDERGROUND ORGANIC CONTAMINATION

CROSS REFERENCE TO RELATED APPLICATION

This application is a continuation-in-part of U.S. patent application Ser. No. 321,578, filed Mar. 9, 1989 and now abandoned, which was a continuation-in-part of U.S. patent application Ser. No. 212,496, filed Jun. 28, 1988 and now abandoned, which in turn was a continuation-in-part of U.S. patent application Ser. No. 820,458, filed Feb. 17, 1986 and now U.S. Pat, No. 4,754,136.

BACKGROUND OF THE INVENTION

This invention relates to detecting and monitoring underground contamination using a neutron activation gauge, sometimes referred to as a neutron backscatter gauge. Further, this invention relates to monitoring the biodegradation of underground contaminants and optionally performing active remediation.

A neutron backscatter gauge utilizes a source of fast neutrons and a detector for slow neutrons. The presence of hydrogen-bearing material, such as an organic liquid or water, is detected by a change in the number of slow neutrons counted in the detector. The number of backscattered slow neutrons is directly related to the number of hydrogen atoms present for slowing the fast neutrons from the source.

A representative neutron backscatter gauge emits fast neutrons from a source comprising americium-241 and beryllium, which require on average about 19 collisions with hydrogen atoms for thermalization of an energy level detectable by a helium-3 gas detector tube. The output of the gauge is a number of "counts" representative of the number of slow neutrons detected and hence the number of hydrogen atoms in the test volume the detector can survey. There can be as much as 10% scatter in the neutron gauge output. This can be reduced by operating the gauge for a longer period which tends to average scatter in the results. Fifteen seconds for a measurement is a reasonable period.

In the prior art, neutron detectors have been used in well logging. Examples of these applications are seen in Mills U.S. Pat. No. 4,268,749. It has also been proposed to measure leakage from pipe lines by passing a neutron backscatter gauge through the pipe line. Such a technique is described in Scherbatskoy U.S. Pat. No. 3,060,315.

There is a need for detecting contamination, for example due to leaks from underground tanks and pipes, particularly tanks that were installed decades ago, using a nondestructive and non-invasive method that is at the same time economical and efficient. Once these leaks are detected, there is a further need to monitor the biodegradation of the contaminants and optionally provide active remediation when needed.

SUMMARY OF THE INVENTION

There is, therefore, provided in practice of this invention according to a presently preferred embodiment a method for detecting underground contamination by organic fluid adjacent to boreholes in the ground adjacent a region to be tested for such contamination. A neutron backscatter gauge is used for measuring the concentration of hydrogen in its test volume at each of a plurality of elevations in such a borehole. The distribution of measurements at several elevations is compared with an expected distribution of measurements from underground sources of hydrogen for characterizing the source of hydrogen detected.

With such a simple and straightforward test, one can distinguish with about 95% confidence between a layer of buried concrete, a stain of organic contamination, and a layer of water infiltrating through the soil, for example. Any of these exemplary substances have hydrogen atoms detected by the neutron backscatter gauge. The rate of change of hydrogen concentration as a function of elevation, particularly at the bottom of such a substance, provides a clear distinction between them.

For such purposes, a neutron backscatter gauge is lowered into each borehole and readings taken at spaced intervals, for example, in the range of from three to twelve inches along the length of such a borehole. The readings from each borehole are plotted and correlated to those obtained from known sources of underground hydrogen.

Another use of the present invention is in buried dump sites containing biodegradable material. The extent of the biodegradation occurring can be evaluated. A plurality of boreholes are provided within the region of the dump site. A pipe sleeve is provided in the boreholes. A neutron backscatter gauge is inserted into each borehole and readings taken at spaced intervals along the length of the borehole. The process is repeated over a period of time.

A profile of the underground activity is obtained. Substantially constant readings of hydrogen concentration at certain regions over a period of time would indicate that anaerobic activity is predominant. Actively changing hydrogen concentration over a period of time would indicate aerobic degradation is in process. Biodegradation can similarly be evaluated by monitoring the concentration of other biodegradation products. The rate of biodegradation may be affected by injecting, for example oxygen, into the region of anaerobic degradation.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION OF PREFERRED EMBODIMENT

Figure 1:
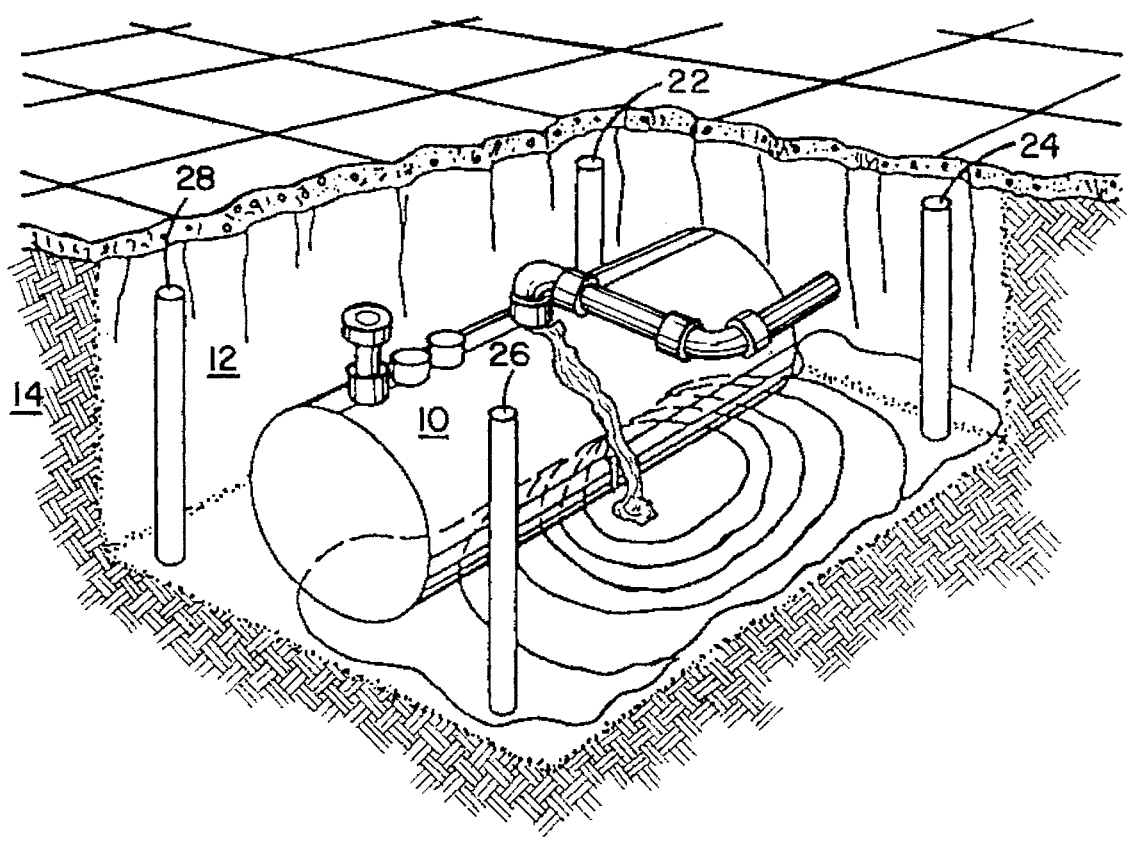
FIG. 1 is a cutaway perspective view of a tank tested by this method.

Referring now to FIG. 1, there is shown a schematic view of one embodiment where the present invention can advantageously be used. The figures show an underground tank 10 buried, as is typical, in containment basin 12 provided in the ground 14. The containment basin is filled with material that may have different compaction, porosity, and material than the surrounding soil, and the interface 16 acts as a boundary wall to substantially contain any leakage from the tank within the containment basin 12. The tank would typically contain organic material, such as gasoline or diesel fuel. Typically also, the containment basin extends to a level below the tank. Such a containment basin and tank are buried in the vadose zone above the prevailing water table in the area. If the tank were below the water table there would be a hazard of the tank floating and erupting toward the ground surface.

Figure 2:
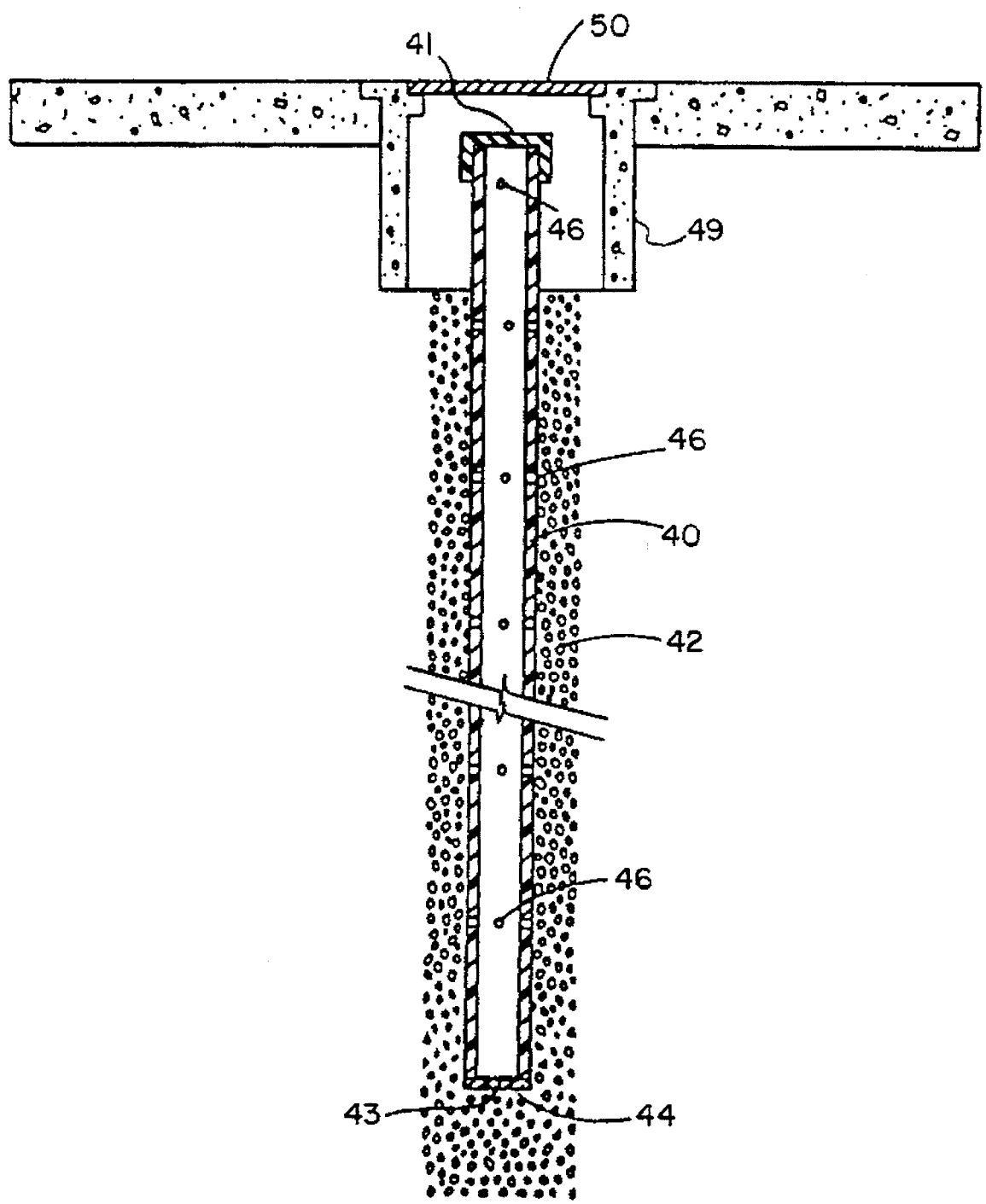
FIG. 2 is a longitudinal sectional view of one test borehole.

FIG. 2 shows one vertical borehole 22 drilled adjacent to a buried tank 10. It is understood that the other test boreholes 24, 26, and 28 would be similar. The borehole is about 6 inches in diameter drilled to a level about four feet or more below tank level. The distance of the borehole from the tank is selected to avoid any inadvertent contact with the tank during drilling of the borehole. Such test boreholes are drilled in an area to be tested for underground organic contamination, which in this embodiment is a buried tank. The technique can also be used adjacent to pipelines, dumping grounds, buildings or other areas where spillage may have introduced underground organic contamination.

FIG. 2 shows a sectional view of one test borehole 20. After the borehole is sunk, a 2½ inch steel pipe 40 is in-inserted to act as a protective sleeve. The pipe is approximately centered and supported in the vertical position by pea gravel 42. The pipe may be plugged at the bottom with cap 44 and capped at the top with a removable cover 41. The top of the pipe is within a small vault 49 covered by a cap 50 to preserve the borehole against weather elements and mechanical damage.

The pipe 40 is preferably perforated at intervals with ⅛ inch holes 46. Slotted pipe can also be used. The purpose of the perforations is to allow vapors present in the backfill area to seep into and collect in the pipe 40. The pea gravel 42 permits the seepage.

To determine whether organic material is adjacent to a borehole, a conventional neutron backscatter gauge is inserted into such a borehole and test readings taken every foot or less. The interval is less than the diameter of the volume tested by the neutron backscatter gauge so that no elevations in the borehole are missed.

A neutron backscatter gauge emits fast neutrons which radiate in all directions into the soil surrounding the borehole. Hydrogen in the soil thermalizes and backscatters a portion of the neutron radiation in the form of slow neutrons which are detected by the neutron backscatter gauge. The volume surveyed by the gauge is roughly a sphere having a radius of about eight or nine inches (the volume depends to some extent on the nature of the surrounding soil). Thus, each reading taken will measure the presence of hydrogen bearing material within an eight to nine inch range. The measurement readings bear a linear relation to the amount of hydrogen in the test volume.

The testing for hydrogen concentration takes into consideration that pellicular water will provide a certain background or "base count" reflected in readings taken in each borehole at approximately the same depth. The neutron backscatter gauge does not distinguish between hydrogen in water and hydrogen in organic molecules. However, presence of leakage from a localized region of the tank 10 will be reflected in an increase in the gauge reading above background. An increase of, say 30%, in gauge count may be considered as evidence of the presence of an extraordinary amount of liquid organic material (or "leaking" fluid), most probably leaking from the underground tank.

Whether or not it is leaking from the underground tank is determined in subsequent testing, wherein volatile portions of the "leaking" liquid are specifically identified. One can then know whether the liquid in the soil conforms to that present in the tank.

The eight or nine inch spherical volumes tested by the neutron backscatter gauge at one-foot intervals in a borehole slightly overlap so that there is a continuum of measurements along the length of the borehole. When it is noted that there is a difference between the counts at successive intervals, a measurement is made at an intervening elevation for measuring the shape of the boundary between the region having a high count and the region having a lower background count.

Thus, for example, if measurements are made at one-foot intervals, the boundary may be better defined by making measurements at six-inch intervals. It is sometimes desirable to take measurements at three-inch intervals to "paint" a better picture of the shape of the boundary. The neutron backscatter gauge responds to all of the hydrogen in the test volume regardless of its distribution. For example, if half of the test volume were in a high hydrogen region and half were in a low hydrogen region, the reading would be halfway between the higher and lower values. Thus, although the volume tested is roughly an eight-inch sphere, the resolution of the shape of the boundary between a region with a high count and a region having the background count can be accurately characterized.

In the typical backfill around a buried tank, for example, the general background of hydrogen in the soil is in the order of 3,000 to 4,000 counts for a representative neutron backscatter gauge. This background is due to absorbed water and water in the minerals making up the soil. When the neutron gauge is below the water table so that the soil is saturated with water, counts in the order of 25,000 may be seen. Pieces of concrete or asphalt buried adjacent to a borehole or layers of bentonite may show counts in the range of from 8,000 to 10,000.

The heavier fractions of hydrocarbons such as gasoline or diesel fuel become absorbed on soil and migrate limited distances. Lighter fractions of these fluids tend to vaporize and may escape from the soil. Soil contaminated with such heavier organic fluids show counts in the order of from 7,000 to 8,000.

Since the neutron gauge measures only the hydrogen concentration and does not characterize the nature of the hydrogen containing compounds, other means have been used for characterization, such as gas chromatographic analysis. It has been found, however, that the nature of the source of the counts can be characterized by the profile of measurements taken at intervals in the borehole.

Various sources of higher than background count in the borehole can be characterized by the magnitude of the count and more particularly by the distribution of measurements at intervals adjacent to the boundaries of the underground region. By determining the rate of change of hydrogen concentration as a function of elevation in the borehole, one can distinguish underground organic contamination from a piece of concrete or from water, with a confidence level of at least 95%. In those circumstances where there is uncertainty, the neutron backscatter gauge tests can still be verified by gas chromatographic analysis.

Figure 3A:
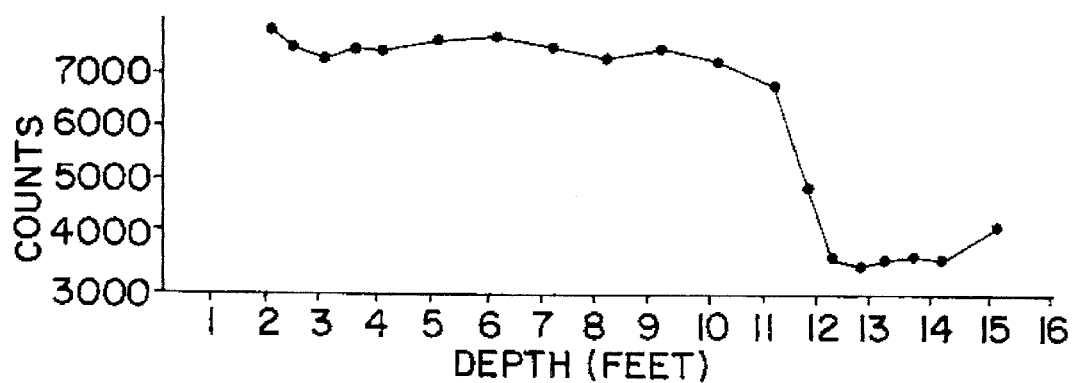
FIG. 3 shows a number of graphs of measurements which can be distinguished by the present method.
Figure 3B:
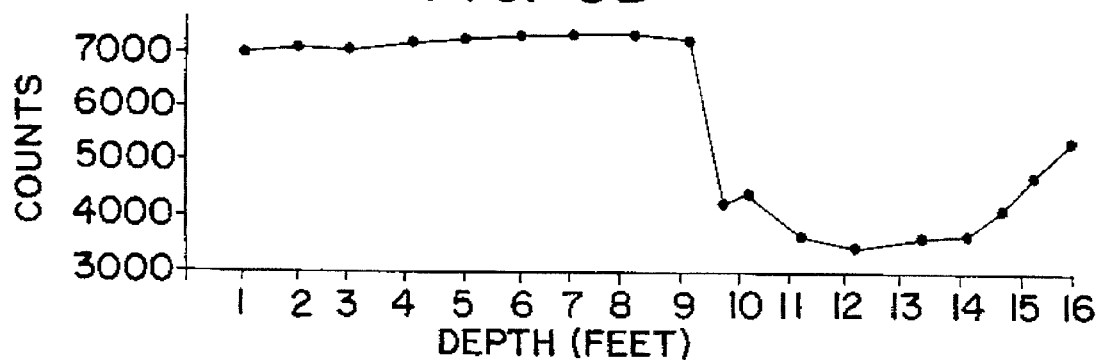
Figure 3C:
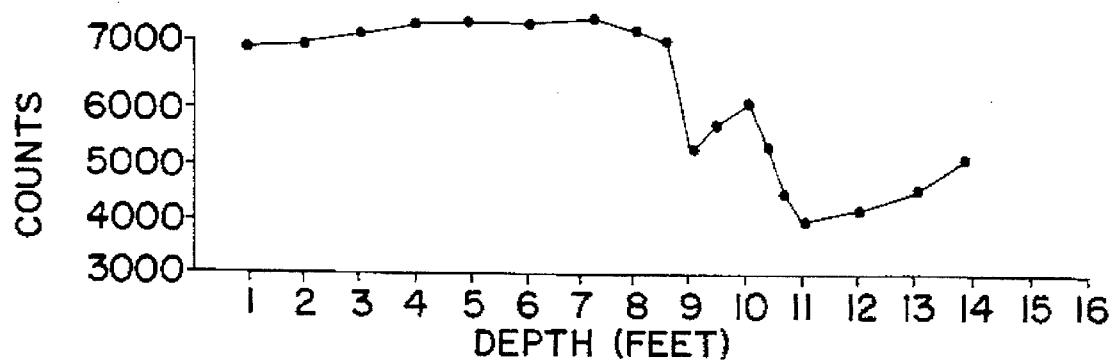

A number of graphs of the counts read in exemplary boreholes as a function of distance from the ground surface are plotted in FIG. 3. Such profiles or their equivalent are used for characterizing the underground sources of hydrogen. Organic contamination may start and end at elevations below the ground surface when the source is a leaking tank, pipe or the like. Such organic material tends to adsorb on the soil particles and has limited migration through the soil. Thus, it tends to stay at around the elevation of the leak, spreading vertically and laterally as liquids and vapors migrate through the soil. The adsorption of the organic material on the soil particles tend to limit migration.

Organic contamination does not usually move downwardly to the water table, but tends to remain "perched" at about the elevation of the leak. Water, on the other hand, moves downwardly through the soil rather rapidly toward the water table. Soil particles typically have as much absorbed water as they are capable of sustaining. Excess water therefore drains through the soil fairly rapidly. This transport may be by liquid water, capillary flow, or by water vapor.

The boundary of a stain of organic contamination, such as gasoline or diesel fuel, typically has a boundary showing a transition from near saturation counts of 7,000 or so to background counts in the order of 4,000 or so over a distance of one to two feet. This transition region is believed to be due to vapor transport of the organic material which more or less gradually contaminates surrounding soil. Since such contamination is typically perched above the water table, the profile of the bottom of the contaminated zone provides a reliable indicator of the presence of organic contamination.

A piece of concrete or asphalt, on the other hand, has a very sharp boundary between the high count of the concrete, for example, and the low background of the surrounding soil. Such a "step" in hydrogen concentration can be easily determined by the neutron backscatter gauge measurements at closely spaced intervals in the hole, and it may be appropriate to forgo costly gas chromatographic testing.

The hydrogen concentration due to water appears quite differently. As mentioned above, water migrates rapidly through the soil, and even when tests are made in the rain or while sprinklers are running, steep transitions between the count due to water and the background count are not typically found near the surface. There is a more or less Gaussian distribution of water concentration in the soil from the region where water is being applied, downwardly toward the background level as the water moves through the soil by vapor transport and capillary action.

Further, at the lower portion of the borehole which approaches the water table there is also a Gaussian distribution of water in the capillary fringe above the water table. The bottom profile of downwardly moving water above the water table is quite similar to the profile of water concentration in the capillary fringe above the water table.

Thus, one can compare the profile of measurements in a borehole to the expected profile from a variety of underground sources of hydrogen. The measured profile can be matched with a relatively sharp boundary of buried concrete or asphalt, a somewhat more diffuse but still steep boundary of hydrocarbon contamination, or with the gradual distribution of water in the soil. In this way underground contamination can be identified with 95% confidence and distinguished from buried concrete or underground water.

In the event there is a question whether a high count in a borehole is due to water temporarily in the soil or organic contamination, an additional set of neutron backscatter measurements can be made at a later time, for example, a few days later. This interval is sufficient to distinguish organic contamination which remains fixed in position in the borehole and water which migrates downwardly toward the water table. Concrete, of course, doesn't move either, but it can be distinguished by the sharp boundary between the high count of the concrete and the low background.

Further, the extent of organic contamination can be outlined by the neutron backscatter gauge. The upper and lower elevations of the contamination can be determined in each borehole. A plurality of boreholes in a region suspected of being contaminated can determine the lateral extent of the contamination.

The graph in FIG. 3 indicates an effect sometimes seen near the lateral extent of the contamination, indicating that the test borehole is near the boundary of the contaminated zone. Organic fluid may move laterally at different rates depending on stratification of the soil.

The neutron backscatter testing is usually an immediate indication of a tank leak. However, it will still indicate only the likelihood of leaking liquid material. It will not identify the organic material, since neutron backscatter alone does not differentiate current leakage from other organic liquids.

Therefore, a second phase of testing may be used if it is desired to specifically confirm that the "leaking" liquid material is indeed the same as contained in the tank, and therefore leaking from the tank. For this test a gas chromatograph (GC) is used in the particular borehole in which organic contamination was indicated. If the GC identification shows positive, i.e., the vapor is the same as vapor from the organic material contained in the tank, it would confirm that the "leaking" liquid was indeed leaking from the tank. If the GC identification shows negative, i.e., the vapor is not the same as the vapor from the organic material contained in the tank, it would rule out tank leak and indicate pollutants from some other source.

The method described is illustrative only, and many changes may be made therein within the scope of the invention. For example, a pipe may be used in the borehole without perforation where there is no need for vapor analysis. If there is to be no vapor analysis, the pipe can be fitted in a smaller hole without the pea gravel. The pipe is used to keep the borehole open for repeat testing and protect the instruments from collapse. Additionally, the pipe may be a steel pipe or a non-metallic pipe. Regardless of details of the borehole and pipe, the neutron backscatter gauge still works and provides the neutron count. Exemplary intervals of elevation in the borehole have been mentioned, but clearly, other intervals could easily be used.

Many other modifications and variations of this technique will be apparent to one skilled in the art. Thus, for example, other techniques for measuring hydrogen concentration in a sample of soil in situ may be used to provide a profile of hydrogen concentration in the soil which may be compared with an expected distribution of hydrogen for distinguishing organic fluid concentration from other sources of hydrogen. As many boreholes as may be desired can be provided in a region suspected of contamination, with measurements made at various elevations in the boreholes for mapping the horizontal and lateral extent of any contamination detected.

Another use of the present invention is in evaluating biodegradation activity in a buried mass (for example, a dump site, or a region of underground contamination).

The biodegradation process involves bacterial breakdown of material. In the process of aerobic degradation, oxygen is utilized, and carbon dioxide generated. Methane is produced as a byproduct also. Biodegradation is a function of conversion of the contaminants into other materials. If the contaminant level gets too dense, it may overcome the bacterial process. If the oxygen level is above 1 or 2 parts per million, the process will be aerobic. If oxygen levels fall below that, anaerobic process takes over.

An anaerobic process may not be desirable because toxic material (methane) is produced. There is a cross-over point between aerobic process and anaerobic process. When the aerobic process is continuing, it is expected that the hydrogen concentration profile of a borehole will be changing rapidly. When the anaerobic process becomes predominant, the hydrogen concentration profile would not change as rapidly.

Figure 4:
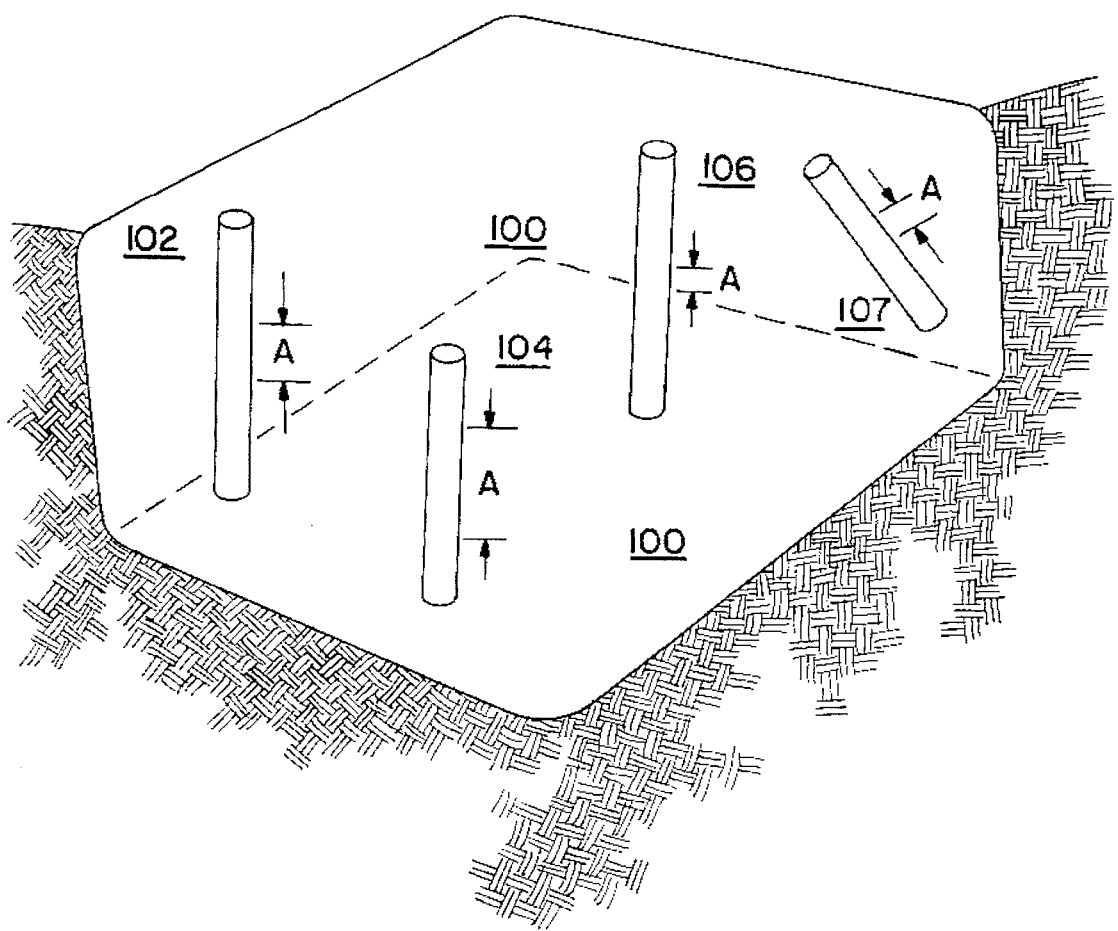
FIG. 4 shows a dump site with boreholes of this method.

FIG. 4 shows a representative buried mass 100 undergoing biodegradation. As before in FIG. 1, a plurality of boreholes 102,104,106 are provided at selected regions of the site 100. A neutron backscatter gauge is lowered into each one of the boreholes and profiles of hydrogen concentration readings are taken over a period of time (which may be hours, days, weeks, etc.). Assume that region "A" at a certain elevation in borehole 102 shows a hydrogen concentration profile that is substantially unchanging. This would indicate that anaerobic process is prominent in that region of the buried mass 100. It may be desirable to stimulate aerobic biodegradation in region "A". This is accomplished by injecting material into the borehole at the region "A" that will stimulate aerobic process. The material 108 may be, for example, oxygen, bacterial slurry, and commercially available material. (Calcium carbonate mixed with water for PH control Sudamom, Batareus, are some of the materials that also may be used.) An example of how the material 108 may be injected into the borehole at region "A" is shown in FIG. 5.

In another embodiment the vapor sample zone may be limited in a vertical or a horizontal well to that depth where neutron logging indicates a hydrogenous anomaly. Fixed gases are then analyzed in the immediate region where the anomaly is observed. Diffusion of atmospheric and other gases will mask evidence of biodegradation (which is simultaneous increases in $CO_2$ or $CH_4$ levels with decrease or near depletion of $O_2$). The headspace vapors may be observed in isolated or non-isolated sections of the wells. The importance is to be in the immediate region where a hydrogenous anomaly is observed. Observation of the appearance of $CH_4$ in the headspace region of the observed hydrogenous anomaly enables the transition of aerobic biodegradation to anaerobic biodegradation to be forecasted.

Figure 5:
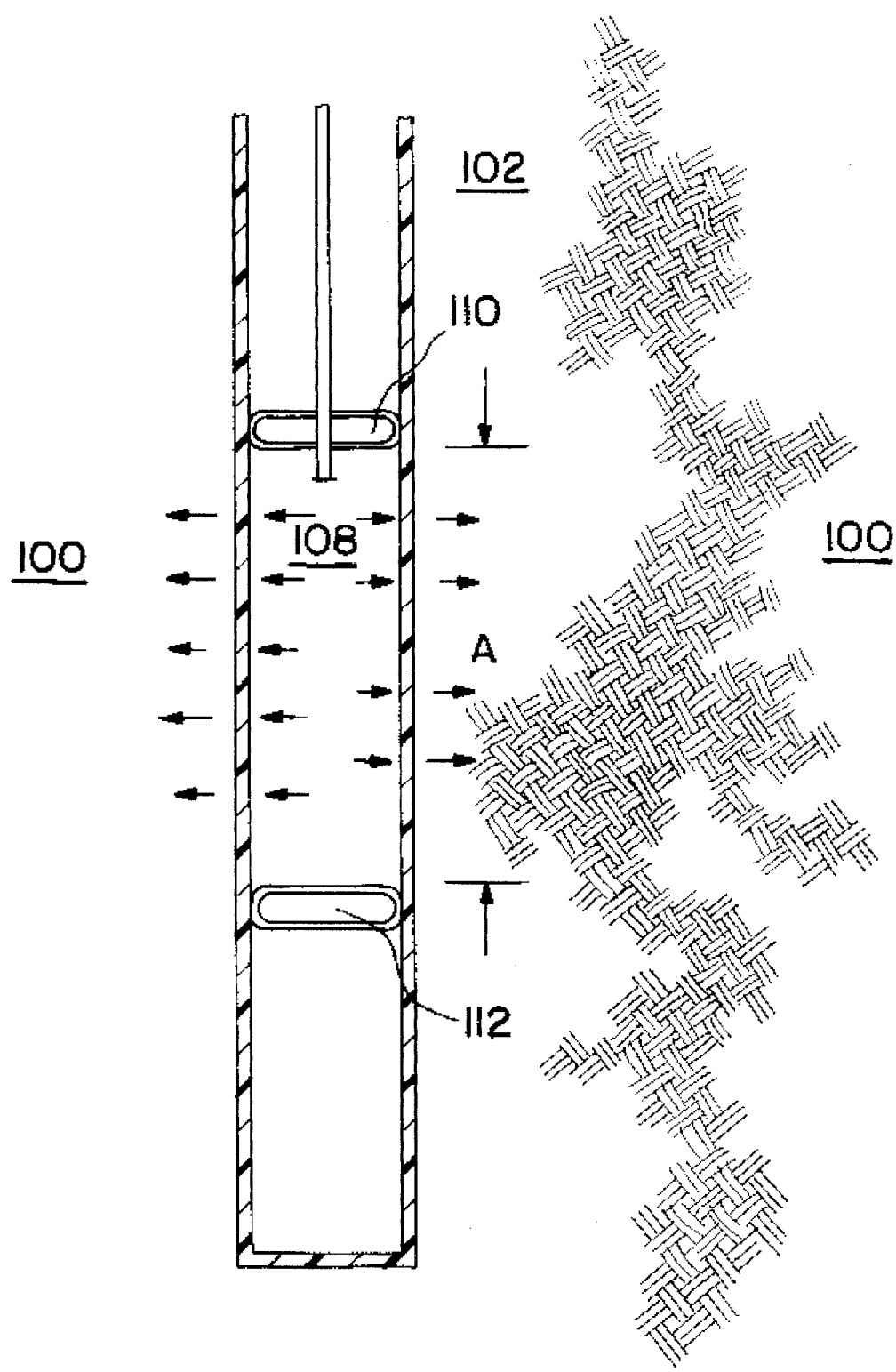
FIG. 5 shows a borehole with a method of stimulating biodegradation of this invention.

FIG. 5 shows a borehole 102 (for example) and region "A" of the buried mass 100. The region "A" is noted by noting the elevations in the borehole. Inflatable stoppers or caps 110 and 112 are used to localize the region in the borehole. A delivery tube means 114 feeds the material 108 into the borehole near the region "A". The material seeps into the region "A" and will stimulate aerobic process. The material 108 may be fed under pressure.

It may be possible to provide the stopper 110 first, fill the borehole to the elevation corresponding to region "A" with material 108, and then provide the stopper 112.

The borehole in FIG. 5 is shown as a vertical one. It may be drilled as a slanted borehole, as represented by numeral 107 in FIG. 4.

While FIG. 5 has shown aerobic process stimulation in one region "A" of the borehole, it should be understood that there may be more than one "A" region in a single borehole.

Having a plurality of boreholes provides a "map" of the biodegradation activity in the mass 100 by extrapolating the profile of each borehole. For example, region "A" indicating an anaerobic process may be found in boreholes 102,104, 106 and 107, at varying elevations. A combination map would provide guidance as to the shape of the region "A" in the mass 100, and general direction of travel of the region "A". With this mapping, corrective steps may be taken properly. For example, a greater number of boreholes for feeding material 108 may be situated in the area of the mass where the region "A" is predominant.

It should be noted that the neutron backscatter gauge, while providing a profile of the hydrogen concentration at different elevations in a borehole, does not distinguish between the various products of biodegradation. In another method of this invention, the neutron backscatter gauge is first used to determine approximately which borehole (if there are more than one) shows the presence of hydrocarbon elements at an elevated level above base or ambient levels. Next, it is desired that the chemical composition of the vapors in the particular borehole be analyzed for their chemical composition using, for example, gas chromatograph, spectrometer, etc.

Mapping is also advantageously employed in determining the migration of contaminated water wetting fronts. Repeated neutron logging of resorbed separated contaminants with a neutron probe allows the separation of contaminants to be identified. In this embodiment the following further steps may be advantageous:

headspace analysis to sepciate separated, resorbed contaminants;

headspace analysis at discrete isolated depths of the migrating wetting front as a function of depth to determine anaerobic and aerobic biological activity in the front; and scintillation analysis for suspected nuclear contaminants at discrete depths where the wetting front is observed.

To analyze a particular borehole, one method is to evacuate the vapors therein and analyze them. This is not very satisfactory as it does not take into account that the vapors may be different along the elevation of the borehole. A better method is to take vapor samples directly at different elevations in the borehole, and analyze them. This would provide a better profile of the vapor contents at different elevations.

The vapor samples at different elevations may be taken using a collection tube lowered into the borehole at selected elevations, coupled to a vacuum means and a vapor receiving means. Alternatively, vapor samples taken for purposes of monitoring biodegradation products can be restricted to a region within the borehole containing contamination by sealing the region using inflatable stoppers or caps. A tube extending through the upper cap is connected to a vacuum means and a vapor receiving means. The vapor sample is then analyzed for its chemical composition. Preferably, readings of the gas content within the soil in the region of contamination around the borehole are obtained by evacuating the vapors within the sealed region prior to taking a vapor sample. The sampled vapor is thus pulled from the soil by the vacuum created in the sealed region.

In another embodiment the dissipation of contaminant layers may be identified by repeated neutron logging of each layer to show decreases in concentration. After a non-contaminated region is identified the rates of decrease of hydrogen concentration of laminated layers is compared with non-comtaminated region.

It is to be understood that the scope of this invention may be practiced otherwise than as specifically described.

What is claimed is:

1. A method of determining the biodegradation actions in an underground site comprising:

providing a plurality of spaced-apart boreholes at selected regions of said site;

providing a neutron backscatter gauge in each borehole;

activating said gauge at spaced intervals along the length of each borehole for reading detection of hydrogen material;

correlating the readings in each borehole to biodegradation activity.

2. A method of affecting the biodegradation actions in an underground site comprising:

providing a plurality of spaced-apart boreholes at selected regions of said site;

providing a neutron backscatter gauge in each borehole;

activating said gauge at spaced intervals along the length of each borehole for reading detection of hydrogen material;

correlating the readings in each borehole to biodegradation activity; and injecting material into said site at selected regions for affecting biodegradation activity in said regions.

3. A method for detecting organic material and determining biodegradation activity comprising:

providing a plurality of spaced-apart boreholes;

providing a neutron backscatter gauge in each borehole;

activating said gauge at spaced intervals along with length of each borehole and reading detection of hydrogen;

correlating said hydrogen detection readings with regions of organic contamination;

sealing said regions of organic contamination within said boreholes;

measuring the vapor content within the sealed regions; and correlating said vapor content to biodegradation activity.

4. A method according to claim 3 further comprising the step of injecting material into said sealed regions to stimulate biodegradation.

5. A method according to claim 4 further comprising the step of evacuating said sealed regions prior to measuring the vapor content within said sealed region.

6. A method according to claim 4 wherein said spaced-apart boreholes include horizontal boreholes.

* * * * *